(12) United States Patent
Liu et al.

(10) Patent No.: US 12,212,479 B2
(45) Date of Patent: Jan. 28, 2025

(54) ESTIMATION OF NETWORK LATENCY BASED ON AGGREGATED PERFORMANCE DATA

(71) Applicant: AT&T Intellectual Property I, L.P., Atlanta, GA (US)

(72) Inventors: Zhengye Liu, Pleasanton, CA (US); Yali Liu, Dublin, CA (US); Vanessa Tan, San Jose, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/957,326

(22) Filed: Sep. 30, 2022

(65) Prior Publication Data
US 2024/0113953 A1 Apr. 4, 2024

(51) Int. Cl.
*H04L 43/067* (2022.01)
*H04L 43/0817* (2022.01)
*H04L 43/50* (2022.01)

(52) U.S. Cl.
CPC ........ *H04L 43/067* (2013.01); *H04L 43/0817* (2013.01); *H04L 43/50* (2013.01)

(58) Field of Classification Search
CPC ... H04L 43/067; H04L 43/08; H04L 43/0817; H04L 43/50; H04L 43/20; H04L 43/0852;
(Continued)

(56) References Cited

U.S. PATENT DOCUMENTS 9,602,377 B2 * 3/2017 Agarwal ................ H04L 43/04
11,516,100 B1 * 11/2022 Zheng ................ H04L 43/0847
11,792,096 B1 * 10/2023 Munn ................ H04L 41/0816 709/224
2007/0027974 A1 * 2/2007 Lee ........................ H04L 43/16 709/223

(Continued)

OTHER PUBLICATIONS

Akella, Gember, Pang, Varshavsky, Caceres. 2012. "Obtaining in-context measurements of cellular network performance". In Proceedings of the 2012 Internet Measurement Conference (IMC '12). Association for Computing Machinery, pp. 287-300. https://doi.org/10.1145/2398776.2398807 (Year: 2012).*

(Continued)

*Primary Examiner* — Rachel J Hackenberg

(57) ABSTRACT

Estimation of network latency based on aggregated performance data is disclosed. End-to-end latency between endpoints can comprise protocol-induced latency, access network-induced, core-network latency, and network-distance-based latency. Network latency, e.g., network-distance-based latency, also referred to as topological latency, can correspond to communication path length between endpoints. Crowdsourcing of communication path performance information can enable estimation of topological latency, and derivatives thereof, such as topological distance. Crowdsourcing can be the practice of obtaining information or input into a task or project by enlisting the services of a large number of people, either paid or unpaid, e.g., collection of performance information. The disclosure illustrates estimation of protocol-induced latency, access network-induced, and core-network latency, such that they can be compensated for in end-to-end latency information, thereby enabling estimation of topological latency that can be employed in determining, initiating, etc., a network response operation that can affect change in a network.

20 Claims, 10 Drawing Sheets

(58) Field of Classification Search
CPC ....... H04L 43/087; H04L 43/10; H04L 43/16; H04L 47/283; H04L 47/12; H04L 47/10; H04L 47/28; H04L 47/29; H04L 47/20; H04L 47/25
See application file for complete search history.

(56) References Cited

U.S. PATENT DOCUMENTS

| | | | | |
|---|---|---|---|---|
| 2017/0060654 | A1* | 3/2017 | Nandakumar | H04L 43/12 |
| 2020/0403876 | A1* | 12/2020 | Liu | H04L 41/16 |
| 2021/0203606 | A1* | 7/2021 | Burroughs | H04W 8/04 |
| 2022/0385543 | A1* | 12/2022 | Villasante Marcos | H04L 41/147 |

OTHER PUBLICATIONS

Kostopoulos, Gjeçi, Baumann, Vuletic, Stamos. "WiFiMon: Combining Crowdsourced and Probe Measurements for Wi-Fi Performance Evaluation," 2021 16th Annual Conference on Wireless On-demand Network Systems and Services Conference (WONS), Klosters, pp. 1-8, doi: 10.23919/WONS51326.2021.9415582. (Year: 2021).*

Liu et al. "Server Selection Corresponding to a Multi-Participant Environment" U.S. Appl. No. 17/951,909, filed Sep. 23, 2022, 55 pages.

Liu et al. "Server Selection for Reducing Latency with a Service Instance" U.S. Appl. No. 17/954,274, filed Sep. 27, 2022, 57 pages.

Liu et al. "Perpetuation of a Distributed Multi-Participant Environment" U.S. Appl. No. 17/960,771, filed Oct. 5, 2022, 52 pages.

* cited by examiner

ESTIMATION OF NETWORK LATENCY BASED ON AGGREGATED PERFORMANCE DATA

TECHNICAL FIELD

The disclosed subject matter relates to estimating network distance between endpoints, and more particularly to estimation of network distance based on aggregated performance data.

BACKGROUND

Conventionally, latency is one of the most used network measurements. Latency significantly affects performance of popular Internet applications, including Internet gaming, video conference, and live video streaming. End-to-end latency typically includes multiple factors, including protocol-induced latency, access network performance-induced latency, core network performance-induced latency, and network distance-based latency. Protocol-induced latency is generally latency introduced by a network protocol and, even under perfect network conditions, e.g., perfect access network conditions, perfect core network conditions, zero network distance, etc., an end-to-end latency cannot be less than protocol-induced latency. Access network performance-induced latency can generally be regarded as latency that corresponds to access network conditions. For wireless networks, access network performance-induced latency can typically be impacted by congestion levels of a base station, signal strength, quality requirements, etc. Access network performance-induced latency can typically have a strong correlation to a specific cell/base station, home network access point (AP), etc., and can vary widely over time and among different access network environments. Core network performance-induced latency can generally correspond to core network performance. Core network performance-induced latency can be significantly affected by network congestion, load on core network elements, e.g., routers, proxies, etc., and can vary widely over time as a network environment changes. Network distance-based latency can be determined by a network distance between a UE/client and a server, e.g., between endpoints. However, in a network, network distance, e.g., a topological distance between endpoints, can be very different from a distance, e.g., a geographical distance between endpoints that, for example, can be calculated based on geolocations of client and server. Network distance-based latency can be affected by imperfect routing where, for example, a topological distance can be much longer than a geolocation-based distance.

Historically, there have been multiple ways to measure a network distance. A first typical technique is to install measurement devices and systems specific to measurement of topological distances. As an example, a pair of measurement devices can be installed at distributed local central offices and a network data center (NDC) or user-plane (UP) equipment. In this example, one end of this pair can send a signal or message, e.g., a 'ping' to the other end. The time to transport the ping can be measured to determine latency that can be regarded as a network distance-based latency. While widely used, this technique can have limitations. In this regard, to measure network distance for the entire network, thousands or tens of thousands of devices can be needed, which can be costly and complex to deploy. Additionally, a data system that can collect and analyze measurement results can be needed, which can also be costly. Furthermore, and perhaps more importantly, when a new network is being launched, the network infrastructure can generally be subject to many adjustments and changes and, accordingly, instrumenting to test latency in the above example can be difficult and plagued with problems limiting effectiveness of such a measurement infrastructure. This can be particularly problematic where it is generally accepted that, when launching a new network, it can be a critical time to measure network distance accurately. It is further noted that massive instrumentation to ping network paths between endpoints also results in measurements that include core network performance-induced latency in addition to network distance-based latency and, in some instances can also include protocol-induced latency and/or access network performance-induced latency. As a result, network distance can be over-estimated, which can be misleading.

DETAILED DESCRIPTION

Figure 1:
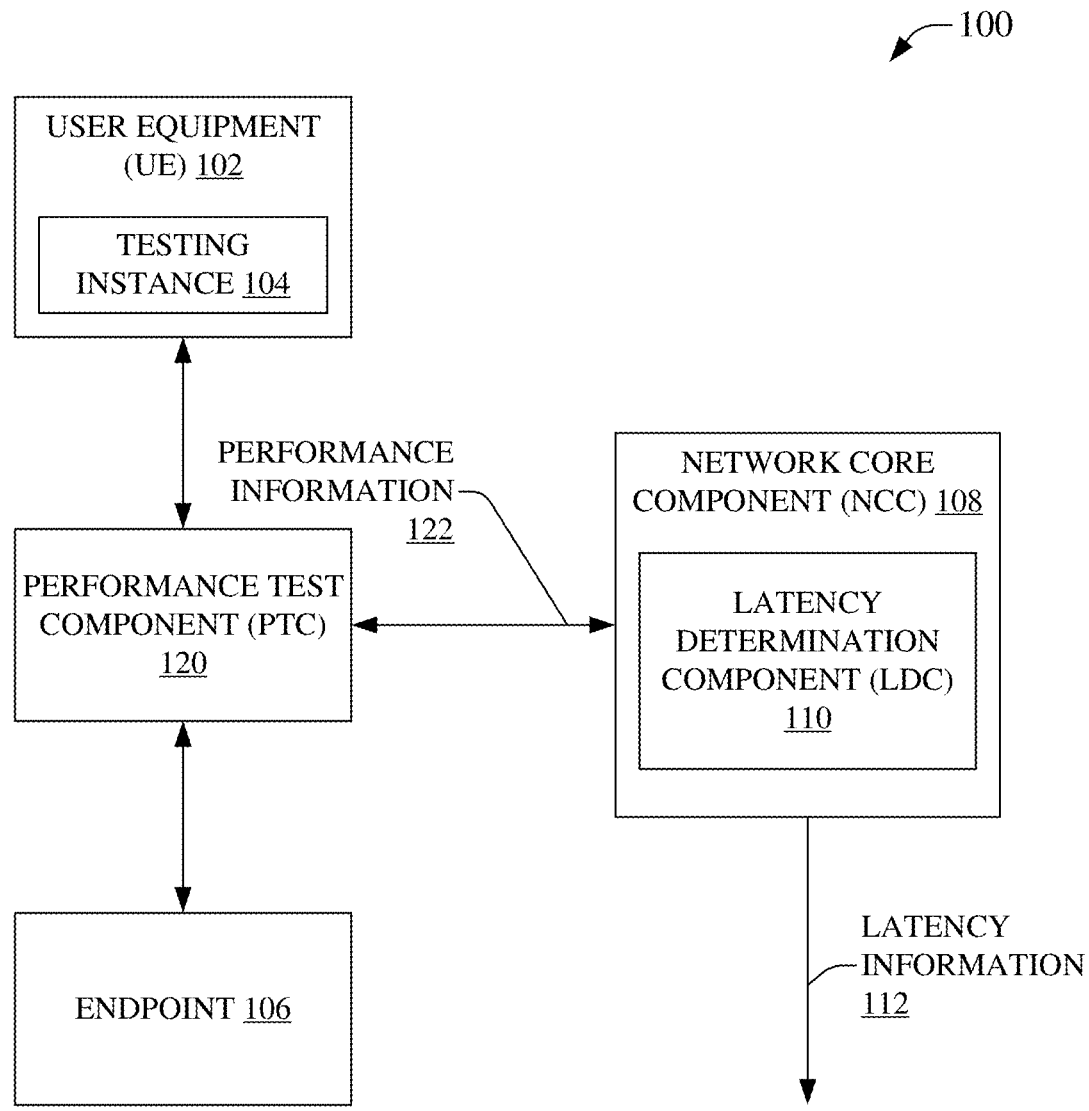
FIG. 1 is an illustration of an example system that can facilitate estimation of network topological latency based on aggregated performance data, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As noted above, latency is a valuable network measurement that can affect performance of applications, services, etc., accessed via a network between endpoints. End-to-end latency typically comprises protocol-induced latency (protocol latency), access network performance-induced latency (access latency), core network performance-induced latency (core latency), and network distance-based latency (topological latency). Topological latency can also be referred to herein as network latency, distance latency, or other similar terms. Protocol latency is generally latency introduced by a network protocol and represents a latency floor, e.g., protocol latency typically exists even in a perfect end-to-end network. Access latency can generally be regarded as latency that corresponds to access network conditions. Core latency can generally correspond to core network performance. Topological latency can correspond to distances between endpoints following a network path that can differ from a simple geographical distance between the endpoints. Tropological latency can be understood to be affected by imperfect routing and a topological distance, and correspondingly a topological latency, can be much greater than a geolocation-based distance.

Conventional estimation of topological latency has generally relied on large-scale instrumenting of networks and endpoints, e.g., thousands or tens of thousands (or more) of devices can be needed to measure signal propagation times and estimate topological latency. Conventional estimation can be understandable costly and complex to deploy. Subsequent analysis of measured signal propagation times can add to cost and complexity. Conventional estimation is difficult to implement for new deployment of a network that can generally be subject to many adjustments and changes, even though determining topological latency corresponding to launch of a new network can be a critical time to measure network distance accurately. Moreover, the conventional estimation of topological latency can generally be contaminated by core latency, protocol latency, and/or access latency, in addition to network distance-based latency, which can result in over-estimating topological latency.

In embodiments of the presently disclosed subject matter, 'crowdsourced' performance data can be employed to estimate topological latency. Applications designed for modern user equipment (UE) already exist and are already in use to measure end-to-end communication performance, e.g., OOKLA, SPEEDTEST.NET, etc., It can be less expensive, less complicated, etc., to purchase data generated by these existing application, in comparison to deploying massive instrumentation. In some embodiments, a network entity can provide an application that can be used by customers, etc., and can be a source of end-to-end performance data similar to that mentions for existing applications but that can avoid the cost of purchasing performance data from a third party. As an example, a network entity can make a test application available for installation on a UE, e.g., mobile device, PC, tablet computer, etc. This example test application can provide end-to-end performance data to the network entity. In some embodiments of this example, the test application can be automated to trigger performance measurement periodically, upon execution of the test application, in response to a user input at the UE, etc. In embodiments of the disclosed subject matter, third-party performance data can be combined with other performance data, such as performance data from the above example network entity developed test application. The above-described end-to-end performance measurements can be considered crowdsourced based on the measurements being performed from UEs attached to a another endpoint via a network rather than being a result of massive instrumentation of a network by a network operator. It is noted that the disclosed end-to-end performance measurements can comprise topological latency in addition protocol latency, access latency, core latency, etc. Accordingly, topological latency can be estimated based on analysis of these end-to-end performance measurements.

As previously noted, protocol latency can generally be regarded as a lowest possible latency where it can be present even in a perfect end-to-end connection. It is noted that crowdsourced end-to-end performance measurements generally include huge numbers of measurements and, according to the law of large numbers, an assumption can be made that a lowest measured end-to-end latency of the end-to-end performance measurements can correspond to a perfect, or nearly perfect, end-to-end connection, such that this lowest measured end-to-end latency can be considered a fair estimation of protocol latency. Accordingly, subtracting the lowest measured end-to-end latency from some other end-to-end latency measurement can be regarded as removing protocol latency from that other end-to-end latency measurement. However, this still leaves contamination by access latency and/or core latency. To cure this issue, the disclosed subject matter can assume that, among similarly situated UEs, these UEs can also have similar access latency and/or core latency influences. As an example, it can be presumed that access latency and/or core latency for a connection between a UE in Miami and a server in Orlando can be uncorrelated to another access latency and/or core latency for a connection between a UE in Seattle and the server in Orlando. However, conversely, it can be presumed that access latency and/or core latency for a connection between a first UE in Miami and a server in Orlando can be correlated to another access latency and/or core latency for a connection between a second UE in Miami and the server in Orlando. Moreover, within a group of similarly situated UEs, it can be presumed that the lowest measured access latency and/or core latency can correspond to a shortest topological distance. Returning to the above example, where the first Miami UE connects to the example server via a shorter topological path than a connection between the second Miami UE and the server, and where the access latency and/or core latency can be presumed to be similar for both the first and second Miami UEs, then the shorter time can be representative of a best topological latency between Miami and the server, e.g., corresponding to a signal propagating along a presumed shortest topological path between Miami and the server. As such, where massive counts of end-to-end performance measurements are available, such as from a crowdsourced data set, etc., a minimum measurement across all markets can be treated as representative of protocol latency, and within a defined market of the markets a presumption can be made that access latency and/or core latency will be similar, then within the defined market, subtracting the protocol latency from the minimum latency in the market can be presumed to yield a fair estimation of topological latency.

In embodiments, topological latency can be employed in modifying, altering, updating, etc., a network, e.g., altering a topology of a network, steering traffic in the network, causing repair of a network, etc. As an example, an accident damaging a connection between nodes of a network can result in a change in topological latency resulting from data taking an alternate path between given endpoints. In this example, determining the change in topological distance can be used to trigger further investigation, dispatch a repair crew, etc. In another example, when newly deploying a network, mismatches between predicted topological latency, e.g., based on known locations of deployed network infrastructure and the speed of light in the communications pathway medium, etc., and topological latency estimated as disclosed herein, can be used to adapt the topology of the network during deployment, trigger further investigation of the cause of the mismatch, etc.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate estimation of network topological latency based on aggregated performance data, in accordance with aspects of the subject disclosure. System 100 can comprise UE 102 that can comprise testing instance 104. Testing instance 104 can be a cause testing of end-to-end performance of a communication pathway between UE 102 and endpoint 106 via performance test component (PTC) 120. In embodiments, PTC 120 can be operated by a third-party entity, e.g., an entity other than a user of UE 102 and a network entity corresponding to network core component (NCC) 108. As an example, a user's tablet computer can connect to the Internet via an internet service provider, e.g., network entity. The example tablet computer can execute code, e.g., testing instance 104, corresponding to an application from a service provider entity. The example service provider application can test performance of the communication pathway between the tablet computer and a server, e.g., endpoint 106. The results of the example testing can be communicated to a service corresponding to the service provider entity, e.g., PTC 120. Generally, many UEs can execute test instances for corresponding communications pathways to many endpoints, and the testing data can be collected by PTC 120. This can be regarded as crowdsourced performance testing. Embodiments of the disclosed subject matter can employ crowdsourced performance data to estimate topological latency. As previously noted, applications designed for UEs already exist and are already in use to measure end-to-end communication performance, e.g., OOKLA, SPEEDTEST-.NET, etc., and it can be less expensive, less complicated, etc., for a network entity to purchase data generated by these existing applications, in comparison to themselves deploying massive instrumentation of their own networks to test latency between network components.

While crowdsourced performance data can be purchased from third parties, e.g., OOKLA, SPEEDTEST.NET, etc., in some embodiments, a network entity can emulate the third-party testing, for example, by themselves, via a contracted external developer, etc., provide an application that can be used by customers to test end-to-end performance of communication pathways. In this regard, it can be appreciated that a network entity can purchase performance data from existing third-party sources, can deploy their own testing instances, etc. As such, a network provider can access end-to-end performance data similar to that mentioned for existing third-party applications, but that can avoid the cost of purchasing performance data from a third party, or can combine third party data with non-third-party data. As an example, a network entity can deploy a test application to UEs, e.g., mobile device, PC, tablet computer, etc. This example test application can provide end-to-end performance data to the network entity without passing through PTC 120. In some embodiments of this example, the test application can be automated to trigger performance measurement periodically, upon execution of the test application, in response to a user input at the UE, etc. In embodiments of the disclosed subject matter, third-party performance data can be combined with other performance data, such as performance data from the above example network entity developed test application. The above described end-to-end performance measurements can be considered crowdsourced data based on the measurements being performed from UEs attached to a another endpoint via a network rather than being a result of massive instrumentation of a network by a network operator. Crowdsourcing can be the practice of obtaining information or input into a task or project by enlisting the services of a large number of people, either paid or unpaid, typically via the Internet. It is noted that the disclosed end-to-end performance measurements can comprise topological latency in addition protocol latency, access latency, core latency, etc. Accordingly, topological latency can be estimated based on analysis of these end-to-end performance measurements.

In embodiments, NCC 108 of system 100 can comprise latency determination component (LDC) 110 that can determine latency information 112 based on crowd sourced end-to-end performance data, e.g., performance information 122. In example system 100, performance information 122 can be received from PTC 120, for example in response to a query from NCC 108. Performance information 122 can comprise results of many testing instances, e.g., testing instance 104 can be one of many crowdsources of performance data. By crowdsourcing performance data, many communication pathways between many UEs and many endpoints can be tested. Generally, in embodiments of the disclosed subject matter, the large numbers of tests generate better results than smaller numbers of tests. In an aspect, there can be some bias to user-initiated performance testing, e.g., a user can be more likely to initiate a test when they are experiencing poor network performance. Accordingly, there can be benefits to a network entity deploying test instances that can automate performance testing in an attempt to reduce the possibility of bias that may arise with user-initiated testing.

As previously noted, protocol latency can generally be regarded as a lowest possible latency where it can be present even in a perfect end-to-end connection. It is noted that crowdsourced end-to-end performance measurements, e.g., performance information 122, etc., can generally include huge numbers of measurements, where millions of performance tests would not be unusual, and, according to the law of large numbers, an assumption can be made that a lowest measured end-to-end latency of the end-to-end performance measurements can correspond to a perfect, or nearly perfect, end-to-end connection, such that this lowest measured end-to-end latency can be considered a fair estimation of protocol latency. Accordingly, subtracting the lowest measured end-to-end latency from some other end-to-end latency measurement can be regarded as removing protocol latency from that other end-to-end latency measurement. In this regard, performance information 122 can comprise a lowest signal round trip time (RTT) of all the RTTs crowdsourced (RTT_all). Accordingly, protocol latency (RTT_p)=min(RTT_all). As such, for any individual RTT measurement (RTT_i_pacn) which can comprise protocol, access, core, and topological latencies, RTT_p can be subtracted therefrom, e.g., non-protocol latencies of an individual measurement (RTT_i_acn) can be RTT_i_acn=(RTT_i_pacn−RTT_p). Accordingly, RTT_i_acn can then comprise access latency, core latency, and topological latency, but no longer be considered to also comprise protocol latency.

Removing protocol latency still leaves access, core, and topological latencies combined in performance information 122. However, it can be assumed that, similarly situated UEs can have experience similar access latency and/or core latency influences. UEs can be grouped in to similarly situated UEs, for example, UEs in a same prat of a city, UEs in a same airport, UEs travelling along a same piece of freeway, etc. In general, these groups similarly situated UEs can be referred to as being 'in the same market'. Accordingly, UEs in a same market can be assumed to experience similar or same access and/or core latencies, and that among UEs in the same market, some lowest RTT can correspond to perfect, or near perfect, access and core latency in that market, such that a lowest RTT within the same market can correspond to a topological latency and protocol latency, e.g., where access and core latencies are perfect and approach zero, then the measured value can estimate just the topological latency and the protocol latency. Again, the law of large numbers can result in reducing the impact of variations in access and/or core latencies for UEs within a same market, e.g., as the number of measurements in a same market increases, the resulting topological latency estimation can become more accurate. In this regard, an individual measurement of topological latency (RTT_i_n)=min(RTT_market)−RTT_p, which can be expanded to (RTT_i_n)=min(RTT_market)−(min(RTT_all)). As such, where massive counts of end-to-end performance measurements are available, such as from a crowdsourced data set, etc., a minimum measurement across all markets can be treated as representative of protocol latency, and within a defined market of the markets a presumption can be made that access latency and/or core latency will be similar such that a market minimum can represent a near zero access and core latency, then within the defined market, subtracting the protocol latency from the minimum latency in the market can be presumed to yield a fair estimation of topological latency.

In embodiments, topological latency can be employed in modifying, altering, updating, etc., a network, e.g., altering a topology of a network, steering traffic in the network, causing repair of a network, etc. As an example, an accident damaging a connection between nodes of a network can result in a change in topological latency resulting from data taking an alternate path between given endpoints. In this example, determining the change in topological distance can be used to trigger further investigation, dispatch a repair crew, etc. In another example, when newly deploying a network, mismatches between predicted topological latency, e.g., based on known locations of deployed network infrastructure and the speed of light in the communications pathway medium, etc., and topological latency estimated as disclosed herein, can be used to adapt the topology of the network during deployment, trigger further investigation of the cause of the mismatch, etc.

Figure 2:
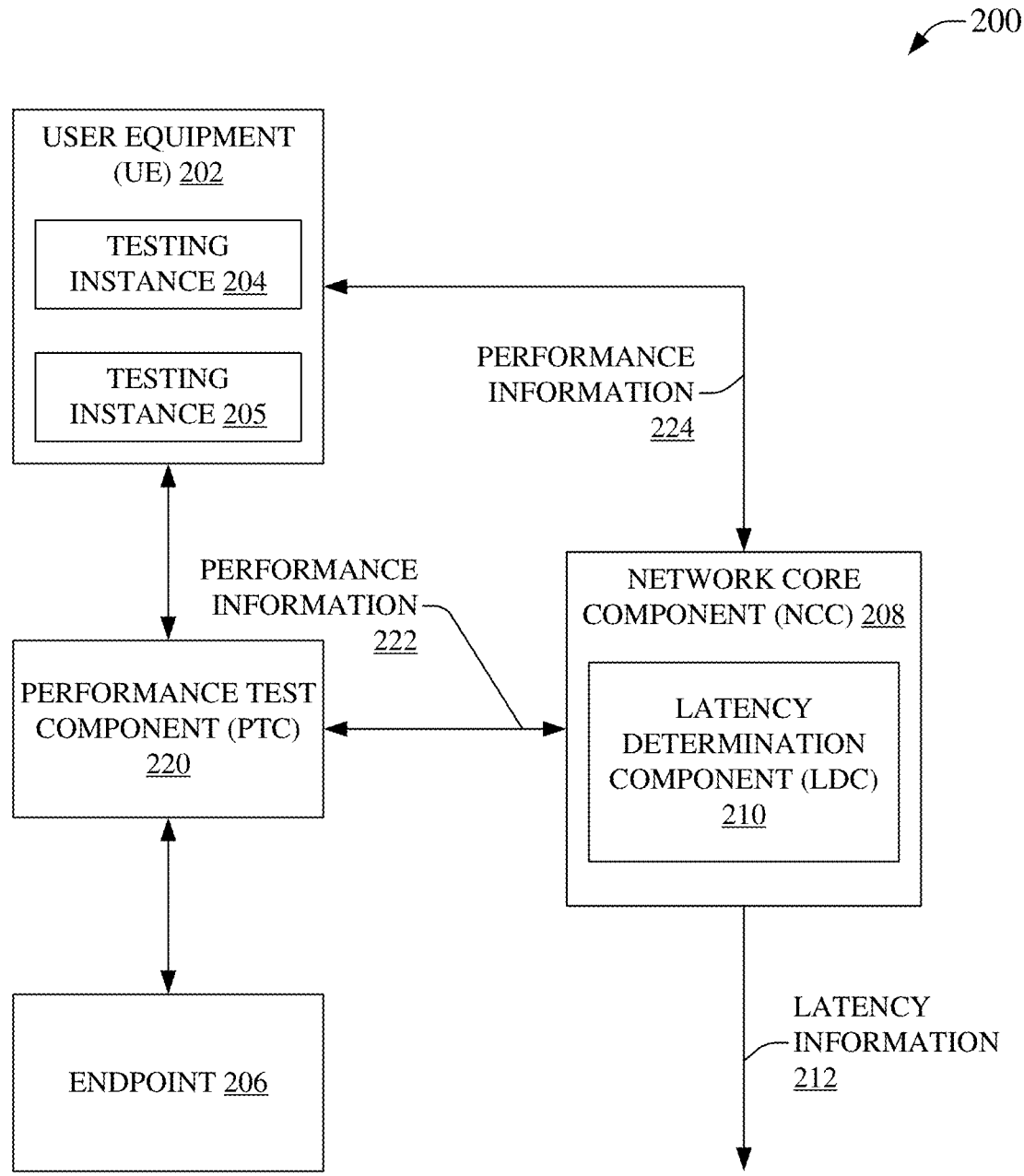
FIG. 2 is an illustration of an example system that can facilitate estimation of network topological latency based on third-party aggregated performance data and non-third-party performance data, in accordance with aspects of the subject disclosure.

FIG. 2 is an illustration of a system 200, which can enable estimation of network topological latency based on third-party aggregated performance data and non-third-party performance data, in accordance with aspects of the subject disclosure. System 200 can comprise UE 202 that can comprise testing instance 204 that can correspond to PTC 220. Testing instance 204 can be a cause of testing end-to-end performance of a communication pathway between UE 202 and endpoint 206 via performance test component (PTC) 220. In embodiments, PTC 220 can be operated by a third-party entity, e.g., an entity other than a user of UE 202 and a network entity corresponding to network core component (NCC) 208. Generally, crowdsourced UEs can execute test instances for corresponding communications pathways to many endpoints, and the testing data can be collected by PTC 220. This can be regarded as crowdsourced performance testing. Embodiments of the disclosed subject matter can employ crowdsourced performance data to estimate topological latency. As previously noted, applications designed for UEs already exist and are already in use to measure end-to-end communication performance, e.g., OOKLA, SPEEDTEST.NET, etc., and it can be less expensive, less complicated, etc., for a network entity to purchase data generated by these existing applications, in comparison to themselves deploying massive instrumentation of their own networks to test latency between network components.

In embodiments, UE 202 can comprise testing instance 205 that can be perform similar performance testing to testing instance 204, however, testing instance 205 can be unaffiliated with PTC 220 or an associated third-party entity. In this regard, a network entity can emulate third-party testing by more directly provide an application that can be used by customers to test end-to-end performance of communication pathways. In embodiments, employing crowdsource testing via testing instance 205 can avoid reliance on third-party data purchase. In some embodiments, employing crowdsource testing via testing instance 205 can augment use of third-party data. Accordingly, a network entity can purchase performance data from existing third-party sources, can deploy their own testing instances, etc. Testing instance 205 can provide end-to-end performance data to NCC 208 without passing through PTC 220, e.g., as performance information 224. In some embodiments of this example, the test application can be automated to trigger performance measurement periodically, upon execution of the test application, in response to a user input at the UE, etc. In an aspect, there can be some bias to user-initiated performance testing, e.g., a user can be more likely to initiate a test when they are experiencing poor network performance. Accordingly, there can be benefits to a network entity deploying test instances that can automate performance testing in an attempt to reduce the possibility of bias that may arise with user-initiated testing. In embodiments of the disclosed subject matter, third-party performance data, e.g., performance information 222, etc., can be combined with other performance data, e.g., performance information 224. Accordingly, topological latency can be estimated based on analysis of these end-to-end performance measurements.

In embodiments, LDC 210 can be comprised in NCC 208 of system 200 and can determine latency information 212 based on crowd sourced end-to-end performance data, e.g., performance information 222, 224, etc. In example system 200, performance information 222 can be received from PTC 220, for example in response to a query from NCC 208. Moreover, performance information 224 can be received form UE 202 without passing through PTC 220. Performance information 222 and performance information 224 can each comprise results of many testing instances, e.g., testing instance 204, 205, etc., can be representative instances of many crowdsources of performance data, e.g., other testing instance on other UEs testing pathways to other endpoints. By crowdsourcing performance data, many communication pathways between many UEs and many endpoints can be tested. Generally, in embodiments of the disclosed subject matter, the large numbers of tests generate better results than smaller numbers of tests.

As previously noted, protocol latency can generally be regarded as a lowest possible latency where it can be present even in a perfect end-to-end connection. It can be assumed that among the huge numbers of measurements, where millions of performance tests would not be unusual, some testing of a nearly perfect network condition can occur where access latency is nearly zero, core latency is nearly zero, and topological latency is nearly zero, such that the dominate effect on latency results from protocol latency. In this regard, performance information 222, 224, etc., can comprise a lowest RTT among RTT_all, such that protocol latency can be defined as (RTT_p)=min(RTT_all). However, to estimate topological latency, core and access latencies still need to be considered. As noted hereinabove, similarly situated UEs can experience similar access latency and/or core latency influences. As before, it can be assumed that among the still huge numbers of measurements for a group of similarly situated UEs, e.g., a market, some testing of a nearly perfect network condition within that marker can occur where access latency is nearly zero, core latency is nearly zero, such that the dominate effects on latency results from topological latency and protocol latency. In this regard, performance information 222, 224, etc., can comprise a lowest RTT among RTT_market. Moreover, where RTT_p has previously been determined, topological latency can be estimated by RTT_i_n=min(RTT_market)–RTT_p, which can be expanded to RTT_i_n=min(RTT_market)–(min(RTT_all)). As such, where massive counts of end-to-end performance measurements are available, such as from one or more crowdsourced data sets, e.g., performance information 222, 224, etc., a minimum measurement across all markets can be treated as representative of protocol latency, and within a defined market of the markets a presumption can be made that access latency and/or core latency will be similar such that a market minimum can represent a near zero access and core latency, then within the defined market, subtracting the protocol latency from the minimum latency in the market can be presumed to yield a fair estimation of topological latency.

In embodiments, topological latency can be employed in modifying, altering, updating, etc., a network, e.g., altering a topology of a network, steering traffic in the network, causing repair of a network, etc. As an example, an accident damaging a connection between nodes of a network can result in a change in topological latency resulting from data taking an alternate path between given endpoints. In this example, determining the change in topological distance can be used to trigger further investigation, dispatch a repair crew, etc. In another example, when newly deploying a network, mismatches between predicted topological latency, e.g., based on known locations of deployed network infrastructure and the speed of light in the communications pathway medium, etc., and topological latency estimated as disclosed herein, can be used to adapt the topology of the network during deployment, trigger further investigation of the cause of the mismatch, etc.

Figure 3:
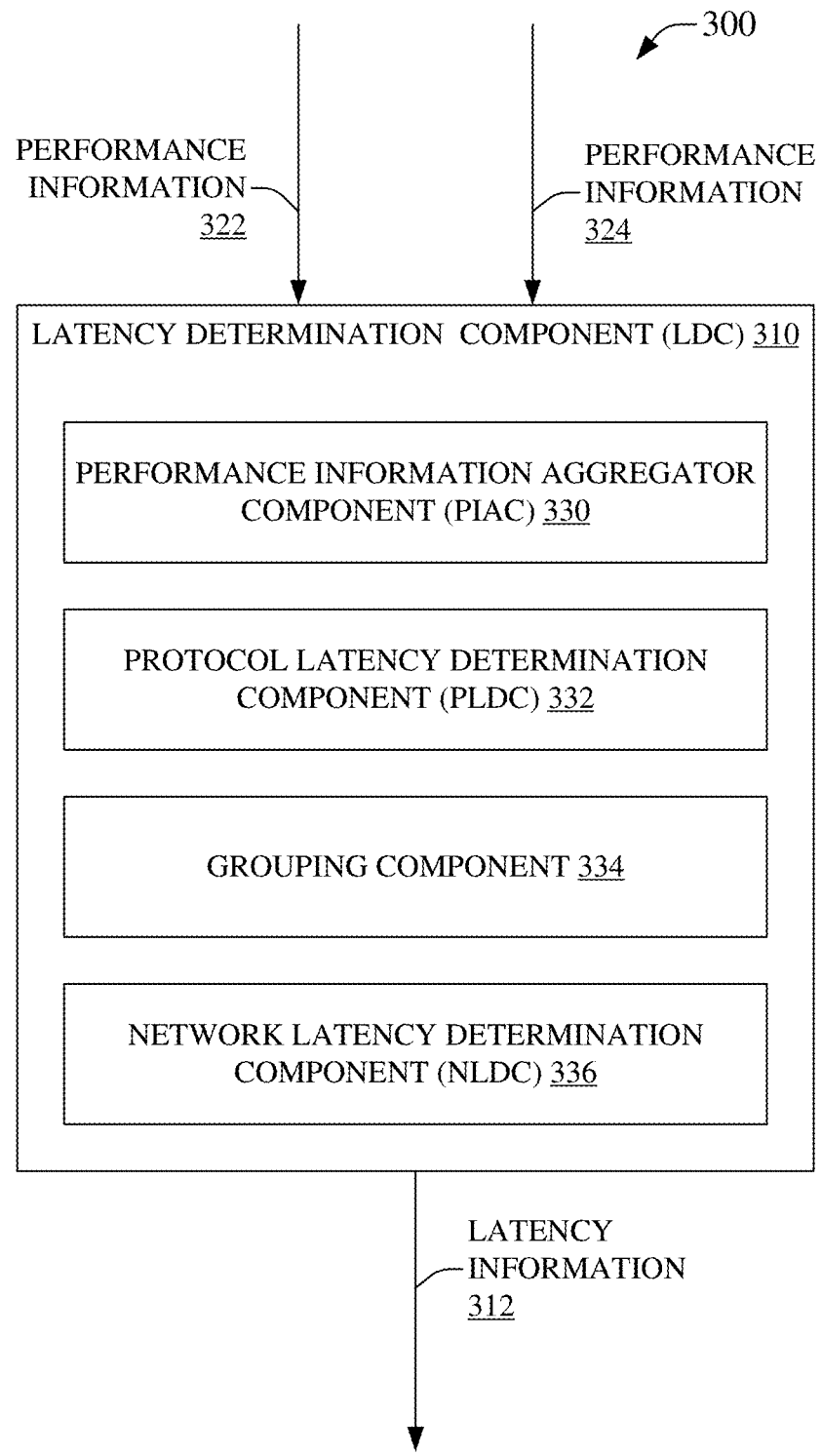
FIG. 3 is an illustration of an example system that can enable estimation of network topological latency based on estimating protocol latency, access latency, and core latency, in accordance with aspects of the subject disclosure.

FIG. 3 is an illustration of a system 300, which can facilitate estimation of network topological latency based on estimating protocol latency, access latency, and core latency, in accordance with aspects of the subject disclosure. System 300 can comprise LDC 310 that can determine latency information 312 based on performance information 322, performance information 324, etc. In embodiments, performance information 322 can be crowdsourced performance data received via a component corresponding to a third-party performance testing entity, e.g., PTC 120, 220, etc. In embodiments, performance information 324 can be crowdsourced performance data not received via a component corresponding to a third-party performance testing entity, e.g., via testing instance 205 of UE 202, etc. As an example, performance information 324 can be received from a testing instance developed by a network entity and distributed to subscriber UEs of a network corresponding to the network entity. In some embodiments, performance information 324 can be provided by a first entity to a second entity, wherein the first entity can then be considered a third party to the second entity, e.g., a network provider can cause performance information 324 to be generated for their own consumption but can also then sell performance information 324 to other network providers.

In embodiments, LDC 310 can comprise performance information aggregator component (PIAC) 330 that can aggregate end-to-end performance data. In embodiments, performance information 322 can be received from one or more third party end-to-end performance data providers. As an example, performance information 322 can comprise some end-to-end performance data from OOKLA and other end-to-end performance data from another network provider. In some embodiments performance information 324 can comprise end-to-end performance data from one or more non-third-party sources. As an example, performance information 324 can comprise some end-to-end performance data from a first network component and some end-to-end performance data from a second network component. PIAC 330 can aggregate end-to-end performance data to facilitate consumption of the end-to-end performance data relative to determining latency information 312.

LDC 310 can comprise protocol latency determination component (PLDC) 322 in some embodiments. PLDC 322 can consume end-to-end performance data, e.g., aggregated end-to-end performance data from PIAC 330, performance information 322, performance information 324, etc. PLDC 322 can determine min(RTT_all) based on the consumed end-to-end performance data. As previously noted, protocol latency can generally be regarded as a lowest possible latency where it can be present even in a perfect end-to-end connection. It can be assumed that among the huge numbers of measurements, where millions of performance tests would not be unusual, some testing of a nearly perfect network condition can occur where access latency is nearly zero, core latency is nearly zero, and topological latency is nearly zero, such that the dominate effect on latency results from protocol latency. In this regard, performance information 322, 324, etc., can comprise a lowest RTT among RTT_all, such that protocol latency can be defined as (RTT_p)=min(RTT_all).

In some embodiments, LDC 310 can comprise grouping component 334 that can group end-to-end performance data into markets. In embodiments, a market can itself comprise one or more other markets, e.g., one or more submarket. Accordingly, markets can be arranged hierarchically. In this regard, RTT_all can represent end-to-end performance data for a first market, e.g., end-to-end performance data for all communication pathways tested, while RTT_market can represent other end-to-end performance data for a second market. Moreover, RTT_market can be a submarket of RTT_all, wherein RTT_market can represent a portion of end-to-end performance data represented in RTT_all. As noted hereinabove, similarly situated UEs can experience similar access latency and/or core latency influences. As before, it can be assumed that among the huge numbers of measurements for a group of similarly situated UEs, e.g., a market, some testing of a nearly perfect network condition within that marker can have occurred where access latency was nearly zero and core latency was nearly zero, such that the dominate effects on latency resulted from topological latency and protocol latency.

Network latency determination component (NLDC) 336 can be comprised in LDC 310 in some embodiments. NLDC 336 can determine network latency, e.g., topological latency. To estimate topological latency, core, access, and protocol latencies need to be considered. As such, where RTT_p has previously been determined via PLDC 332, topological latency can be estimated by RTT_i_n=min(RTT_market)–RTT_p, which can be expanded to RTT_i_n=min(RTT_market)–(min(RTT_all)). Latency information 312 can indicate RTT_i_n, a topological latency for a communication pathway between endpoints, e.g., a UE and a server, etc. Generally, crowdsourced UEs can execute test instances for corresponding communications pathways to many endpoints. As previously noted, increasing a count of measurements typically can be associated with increased accuracy of topological latency estimation. As such, where massive counts of end-to-end performance measurements are available, such as from one or more crowdsourced data sets, e.g., performance information 322, 324, etc., a minimum measurement across all markets can be treated as representative of protocol latency, and within a defined market of the markets a presumption can be made that access latency and/or core latency will be similar such that a market minimum can represent a near zero access and core latency, then within the defined market, subtracting the protocol latency from the minimum latency in the market can be presumed to yield a fair estimation of topological latency.

In embodiments, topological latency can be employed in modifying, altering, updating, etc., a network, e.g., altering a topology of a network, steering traffic in the network, causing repair of a network, etc. As an example, an accident damaging a connection between nodes of a network can result in a change in topological latency resulting from data taking an alternate path between given endpoints. In this example, determining the change in topological distance can be used to trigger further investigation, dispatch a repair crew, etc. In another example, when newly deploying a network, mismatches between predicted topological latency, e.g., based on known locations of deployed network infrastructure and the speed of light in the communications pathway medium, etc., and topological latency estimated as disclosed herein, can be used to adapt the topology of the network during deployment, trigger further investigation of the cause of the mismatch, etc.

Figure 4:
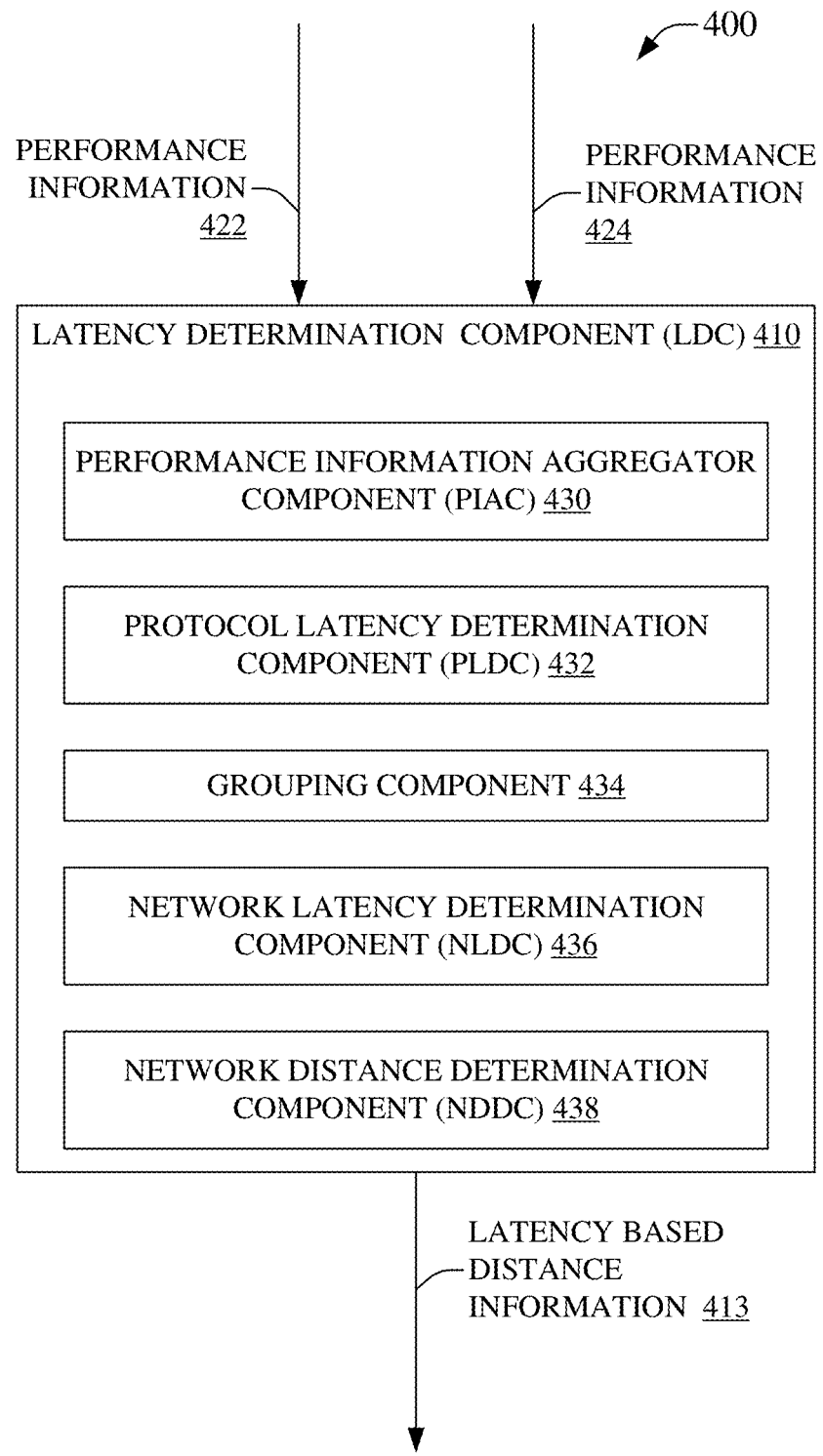
FIG. 4 illustrates an example system that can facilitate estimation of network topological distance based on estimating network topological latency, in accordance with aspects of the subject disclosure.

FIG. 4 is an illustration of a system 400, which can enable estimation of network topological distance based on estimating network topological latency, in accordance with aspects of the subject disclosure. System 400 can comprise LDC 410 that can determine latency-based distance information 413 based on performance information 422, performance information 424, etc. In embodiments, performance information 422 can be crowdsourced performance data received via a component corresponding to a third-party performance testing entity, e.g., PTC 120, 220, etc. In embodiments, performance information 424 can be crowdsourced performance data not received via a component corresponding to a third-party performance testing entity, e.g., via testing instance 205 of UE 202, etc. In some embodiments, performance information 424 can be provided by a first entity to a second entity, wherein the first entity can then be considered a third party to the second entity, e.g., a network provider can receive performance information 424 for their own consumption but can also then sell, share, etc., performance information 424 to other network providers.

In embodiments, LDC 410 can comprise performance information aggregator component (PIAC) 430 that can aggregate end-to-end performance data. In embodiments, performance information 422 can be received from one or more third party end-to-end performance data providers. In some embodiments performance information 424 can comprise end-to-end performance data from one or more non-third-party sources. PIAC 430 can aggregate end-to-end performance data to facilitate consumption of the end-to-end performance data relative to determining latency information. Latency information can be employed to determine latency based distance information 413.

In some embodiments, LDC 410 can comprise protocol latency determination component (PLDC) 422, which can consume end-to-end performance data, e.g., aggregated end-to-end performance data from PIAC 430, performance information 422, performance information 424, etc. As previously noted, protocol latency can generally be regarded as a lowest possible latency where it can be present even in a perfect end-to-end connection. It can be assumed that among the huge numbers of measurements, where millions of performance tests would not be unusual, some testing of a nearly perfect network condition can occur where access latency is nearly zero, core latency is nearly zero, and topological latency is nearly zero, such that the dominate effect on latency results from protocol latency. PLDC 422 can determine min(RTT_all) based on the consumed end-to-end performance data. In this regard, performance information 422, 424, etc., can comprise a lowest RTT among RTT_all, such that protocol latency can be defined as (RTT_p)=min(RTT_all).

In some embodiments, LDC 410 can comprise grouping component 434 that can group end-to-end performance data into markets. In embodiments, a market can itself comprise one or more other markets, e.g., one or more submarket. Accordingly, markets can be arranged hierarchically. In this regard, RTT_all can represent end-to-end performance data for a first market, e.g., end-to-end performance data for all communication pathways tested, while RTT_market can represent other end-to-end performance data for a second market. Moreover, RTT_market can be a submarket of RTT_all, wherein RTT_market can represent a portion of end-to-end performance data represented in RTT_all. As noted hereinabove, similarly situated UEs can experience similar access latency and/or core latency influences. As before, it can be assumed that among the huge numbers of measurements for a group of similarly situated UEs, e.g., a market, some testing of a nearly perfect network condition within that marker can have occurred where access latency was nearly zero and core latency was nearly zero, such that the dominate effects on latency resulted from topological latency and protocol latency.

In some embodiments, network latency determination component (NLDC) 436 can be comprised in LDC 410. NLDC 436 can estimate network latency, e.g., topological latency. To estimate topological latency, core, access, and protocol latencies need to be considered. As such, where RTT_p has previously been determined, e.g., via PLDC 432, topological latency can be estimated by RTT_i_n=min(RTT_market)–RTT_p, which can be expanded to RTT_i_n=min(RTT_market)–(min(RTT_all)). Latency information can indicate RTT_i_n, a topological latency for a communication pathway between endpoints, e.g., a UE and a server, etc. Generally, crowdsourced UEs can execute test instances for corresponding communications pathways to many endpoints. As previously noted, increasing a count of measurements typically can be associated with increased accuracy of topological latency estimation. As such, where massive counts of end-to-end performance measurements are available, such as from one or more crowdsourced data sets, e.g., performance information 422, 424, etc., a minimum measurement across all markets can be treated as representative of protocol latency, and within a defined market of the markets a presumption can be made that access latency and/or core latency will be similar such that a market minimum can represent a near zero access and core latency, then within the defined market, subtracting the protocol latency from the minimum latency in the market can be presumed to yield a fair estimation of topological latency.

In embodiments, topological latency can be employed in modifying, altering, updating, etc., a network, e.g., altering a topology of a network, steering traffic in the network, causing repair of a network, etc. As an example, an accident damaging a connection between nodes of a network can result in a change in topological latency resulting from data taking an alternate path between given endpoints. In this example, determining the change in topological distance can be used to trigger further investigation, dispatch a repair crew, etc. In another example, when newly deploying a network, mismatches between predicted topological latency, e.g., based on known locations of deployed network infrastructure and the speed of light in the communications pathway medium, etc., and topological latency estimated as disclosed herein, can be used to adapt the topology of the network during deployment, trigger further investigation of the cause of the mismatch, etc.

In embodiments, topological latency can be employed in determining latency-based distance information 413. In an aspect, a signal can propagate across a communication path at the speed of light for a material of the communication path. Accordingly, LDC 410 can estimate latency-based distance in of 413 from topological latency and information about the medium of the communication pathway. In an example, a communication pathway can be via a fiber optical cable. As such, in this example, latency-based distance in of 413 can be equal to RTT_i_n*S/2, where S is the speed of light in the fiber optical cable. Conversion between latency and distance can be useful for presenting topological information, e.g., topological latency 312, latency-based distance in of 413, etc., for consumption by other components, systems, etc.

Figure 5:
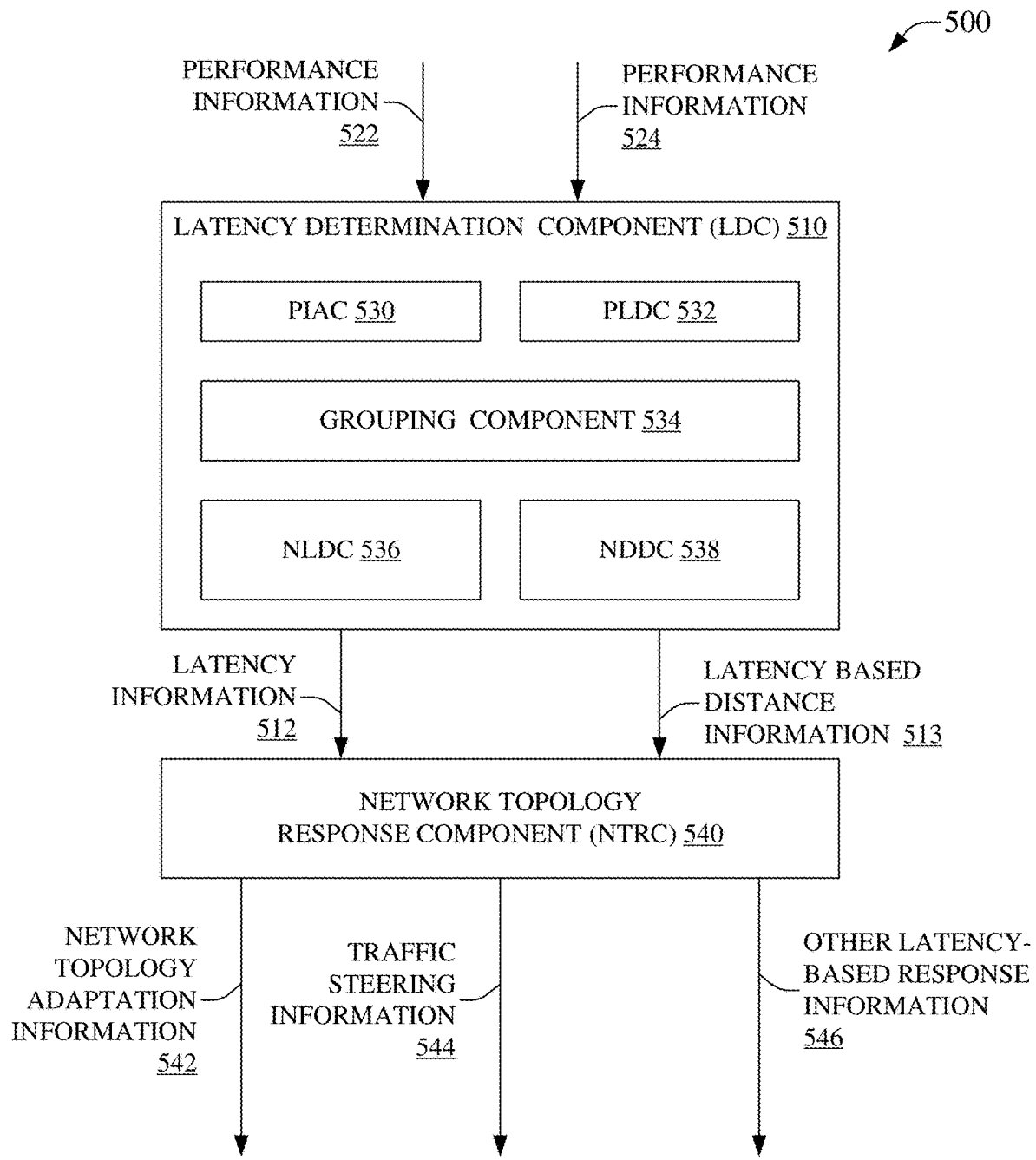
FIG. 5 illustrates an example system that can enable a network topological response based on an estimation of network topological latency, in accordance with aspects of the subject disclosure.

FIG. 5 is an illustration of a system 500, which can facilitate causing a network topological response based on an estimation of network topological latency, in accordance with aspects of the subject disclosure. System 500 can comprise LDC 510 that can determine latency-based distance information 513 based on performance information 522, performance information 524, etc. In embodiments, performance information 522 can be crowdsourced performance data received via a component corresponding to a third-party performance testing entity, e.g., PTC 120, 220, etc. In embodiments, performance information 524 can be crowdsourced performance data not received via a component corresponding to a third-party performance testing entity, e.g., via testing instance 205 of UE 202, etc. In some embodiments, performance information 524 can be provided by a first entity to a second entity, wherein the first entity can then be considered a third party to the second entity, e.g., a network provider can receive performance information 524 for their own consumption but can also then sell, share, etc., performance information 524 to other network providers.

In embodiments, LDC 510 can comprise performance information aggregator component (PIAC) 530 that can aggregate end-to-end performance data. In embodiments, performance information 522 can be received from one or more third party end-to-end performance data providers. In some embodiments performance information 524 can comprise end-to-end performance data from one or more non-third-party sources. PIAC 530 can aggregate end-to-end performance data to facilitate consumption of the end-to-end performance data relative to determining latency information 512. Latency information 512 can be employed to determine latency-based distance information 513.

In some embodiments, LDC 510 can comprise protocol latency determination component (PLDC) 522, which can consume end-to-end performance data, e.g., aggregated end-to-end performance data from PIAC 530, performance information 522, performance information 524, etc. As previously noted, protocol latency can generally be regarded as a lowest possible latency where it can be present even in a perfect end-to-end connection. It can be assumed that among the huge numbers of measurements, where millions of performance tests would not be unusual, some testing of a nearly perfect network condition can occur where access latency is nearly zero, core latency is nearly zero, and topological latency is nearly zero, such that the dominate effect on latency results from protocol latency. PLDC 522 can determine min(RTT_all) based on the consumed end-to-end performance data. In this regard, performance information 522, 524, etc., can comprise a lowest RTT among RTT_all, such that protocol latency can be defined as (RTT_p)=min(RTT_all).

In some embodiments, LDC 510 can comprise grouping component 534 that can group end-to-end performance data into markets. In embodiments, a market can itself comprise one or more other markets, e.g., one or more submarket. Accordingly, markets can be arranged hierarchically. In this regard, RTT_all can represent end-to-end performance data for a first market, e.g., end-to-end performance data for all communication pathways tested, while RTT_market can represent other end-to-end performance data for a second market. Moreover, RTT_market can be a submarket of RTT_all, wherein RTT_market can represent a portion of end-to-end performance data represented in RTT_all. As noted hereinabove, similarly situated UEs can experience similar access latency and/or core latency influences. As before, it can be assumed that among the huge numbers of measurements for a group of similarly situated UEs, e.g., a market, some testing of a nearly perfect network condition within that marker can have occurred where access latency was nearly zero and core latency was nearly zero, such that the dominate effects on latency resulted from topological latency and protocol latency.

In some embodiments, network latency determination component (NLDC) 536 can be comprised in LDC 510. NLDC 536 can estimate network latency, e.g., topological latency. To estimate topological latency, core, access, and protocol latencies need to be considered. As such, where RTT_p has previously been determined, e.g., via PLDC 532, topological latency can be estimated by RTT_i_n=min(RTT_market)−RTT_p, which can be expanded to RTT_i_n=min(RTT_market)−(min(RTT_all)). Latency information 512 can indicate RTT_i_n, a topological latency for a communication pathway between endpoints, e.g., a UE and a server, etc. Generally, crowdsourced UEs can execute test instances for corresponding communications pathways to many endpoints. As previously noted, increasing a count of measurements typically can be associated with increased accuracy of topological latency estimation. As such, where massive counts of end-to-end performance measurements are available, such as from one or more crowdsourced data sets, e.g., performance information 522, 524, etc., a minimum measurement across all markets can be treated as representative of protocol latency, and within a defined market of the markets a presumption can be made that access latency and/or core latency will be similar such that a market minimum can represent a near zero access and core latency, then within the defined market, subtracting the protocol latency from the minimum latency in the market can be presumed to yield a fair estimation of topological latency, which can be represented via latency information 512.

In embodiments, topological latency can be employed in determining latency-based distance information 513. In an aspect, a signal can propagate across a communication path at the speed of light for a material of the communication path. Accordingly, LDC 510 can estimate latency-based distance in of 513 from topological latency and information about the medium of the communication pathway. In an example, a communication pathway can be via a fiber optical cable. As such, in this example, latency-based distance in of 513 can be equal to $RTT\_i\_n*S/2$, where S is the speed of light in the fiber optical cable. Conversion between latency and distance can be useful for presenting topological information, e.g., latency information 512, latency-based distance in of 513, etc., for consumption by other components, systems, etc.

In embodiments, network topology response component (NTRC) 540 can employ topological latency, e.g., latency information 512, and/or topological distance, e.g., latency-based distance in of 513, to cause modification, alteration, update to, etc., a network, e.g., altering a topology of a network, steering traffic in the network, causing repair of a network, etc. NTRC 540 can receive latency information 512. NTRC 540 can receive latency-based distance in of 513. NTRC 540, based on latency information 512, latency-based distance in of 513, or combinations thereof, can generate information that can modification, alteration, update to, etc., a network. Examples of information generated by NTRC 540 can comprise network topology adaptation information 542, traffic steering information 544, network repair response information, pricing information, other latency-based response information 546, etc. In an example, when newly deploying a network, mismatches between predicted topological latency, e.g., based on known locations of deployed network infrastructure and the speed of light in the communications pathway medium, etc., and topological latency estimated as disclosed herein, e.g., latency information 512, can be used to adapt the topology of the network during deployment, e.g., based on network topology adaptation information 542, trigger further investigation of the cause of the mismatch, etc. As another example, an accident damaging a connection between nodes of a network can result in a change in topological latency resulting from data taking an alternate path between given endpoints. In this example, determining the change in topological distance, e.g., latency-based distance information 513, can be used to trigger further investigation, dispatch a repair crew, etc., via other latency-based response information 546. In a further example, latency information 512 can impact multi-person interactive virtual environments, e.g., reducing 'laggyness' that can result from elevated latency can be desirable, which can be addressed by steering network traffic via lower latency communication pathways based on traffic steering information 544.

Figure 6:
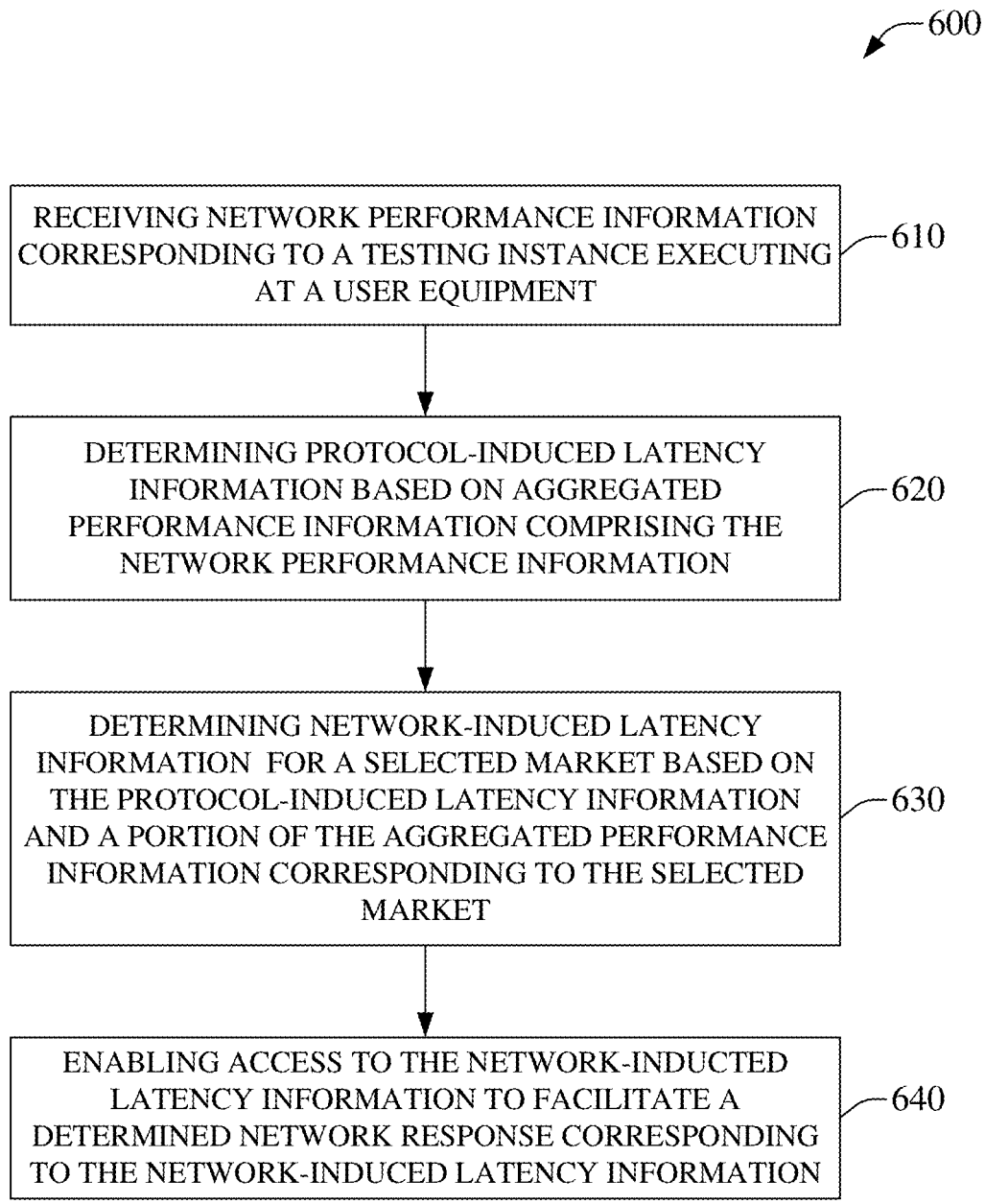
FIG. 6 is an illustration of an example method enabling estimation of network topological latency based on aggregated performance data, in accordance with aspects of the subject disclosure.
Figure 7:
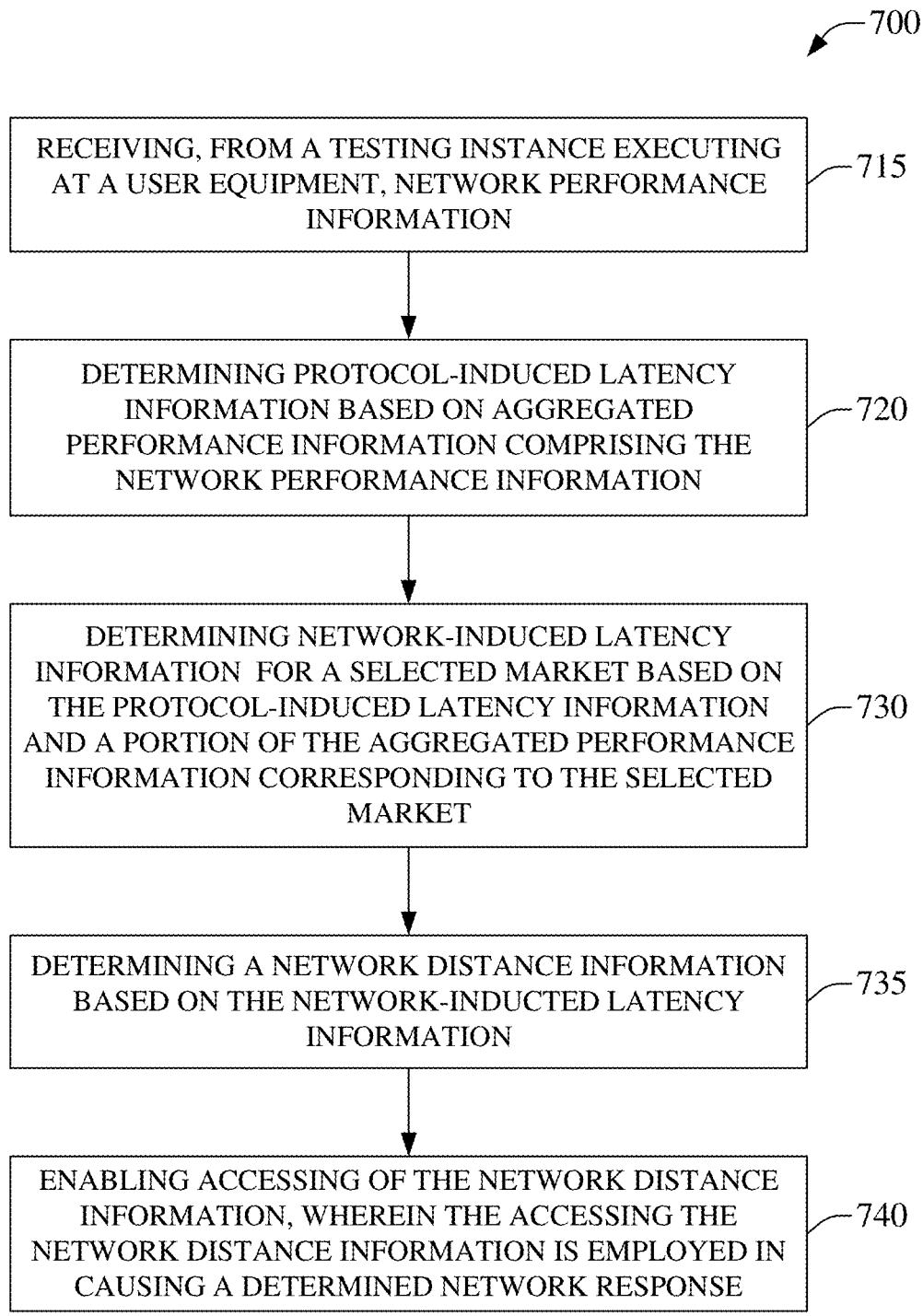
FIG. 7 illustrates an example method, enabling estimation of network topological latency based on third-party aggregated performance data and non-third-party performance data, in accordance with aspects of the subject disclosure.
Figure 8:
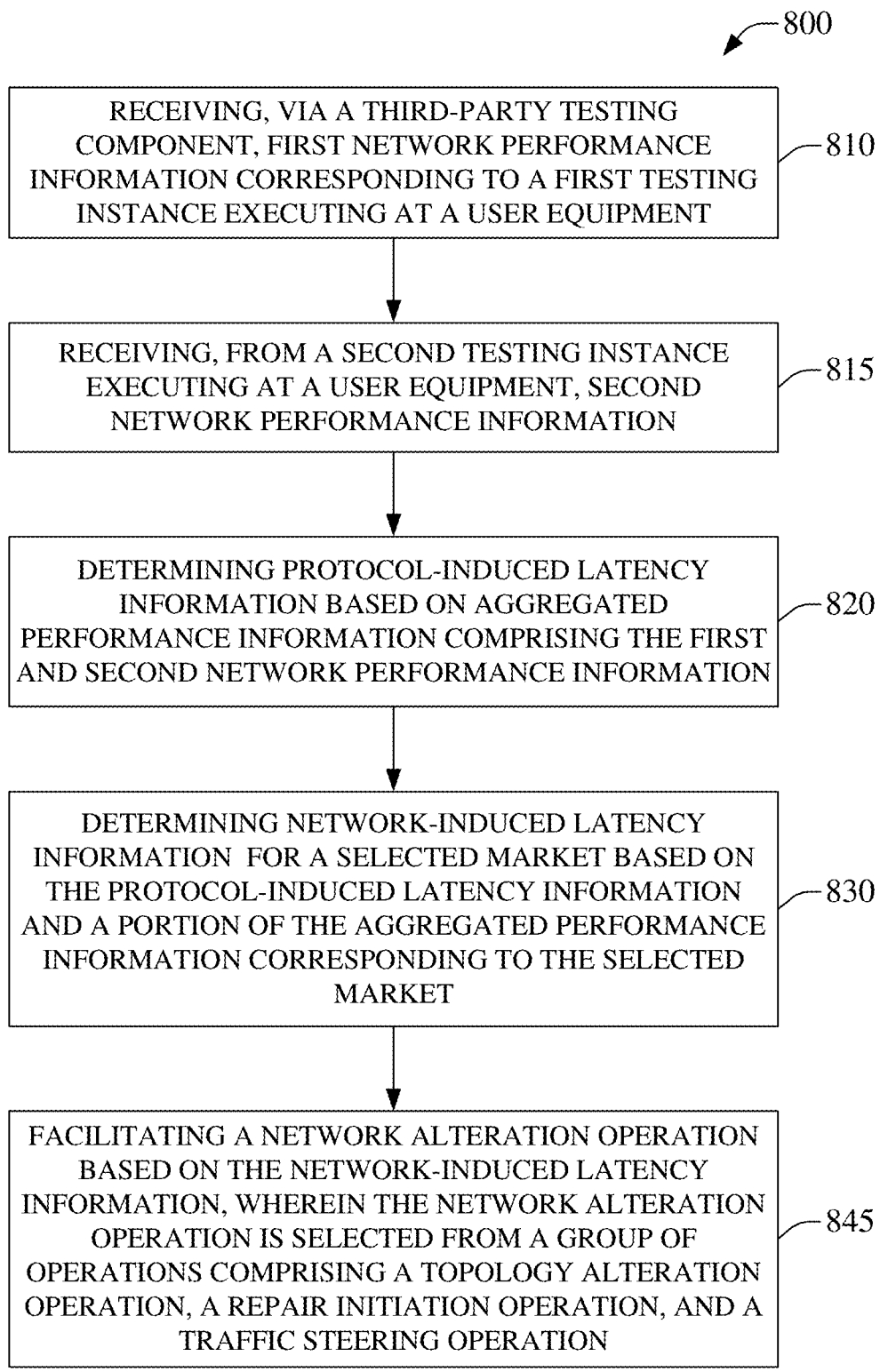
FIG. 8 illustrates an example method, facilitating triggering a network topological response based on an estimation of network topological latency, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of example method 600, which can facilitate estimating network topological latency based on aggregated performance data, in accordance with aspects of the subject disclosure. System 600, at 610, can comprise receiving network performance information corresponding to a testing instance executing at a user equipment. Communication pathways between endpoints can be tested, e.g., via testing instances, which can result in end-to-end performance data. In some embodiments, performance data can be captured by a third-party entity, e.g., an entity other than a user of an endpoint, a network entity, etc., and can be shared, sold, etc., to a network entity. In some embodiments, performance data can be captured by a network entity via testing instances that can be the same as, or similar to, testing instances employed by a third-party. Both third-party and direct performance testing of communication pathways can be regarded as crowdsourced performance testing as disclosed elsewhere herein. Topological latency can be estimated based on analysis of these crowdsourced end-to-end performance measurements.

At 620, method 600 can comprise, determining protocol-induced latency information based on aggregated performance information comprising the network performance information. Protocol latency can generally be regarded as a lowest possible latency and is present even in a perfect end-to-end communication pathway. It can be assumed that among the huge numbers of measurements, where millions of performance tests would not be unusual, some testing of a nearly perfect network condition can occur where access latency is nearly zero, core latency is nearly zero, and topological latency is nearly zero, such that the dominant effect on latency is a result of protocol latency. As such, protocol latency ($RTT\_p$) can be estimated as $RTT\_p=\min(RTT\_all)$, where $RTT\_all$ can be the round-trip time from the performance data for all markets.

Method 600, at 630, can comprise determining network-induced latency information for a selected market based on the protocol-induced latency information and a portion of the aggregated performance information corresponding to the selected market. Generally, crowdsourced UEs can execute test instances for corresponding communications pathways to many endpoints. As previously noted, increasing a count of measurements typically can be associated with increased accuracy of topological latency estimation. As such, where massive counts of end-to-end performance measurements are available, a minimum measurement across all markets can be treated as representative of protocol latency, and within a defined market of the markets a presumption can be made that access latency and/or core latency will be similar such that a market minimum can represent a near zero access and core latency, then within the defined market, subtracting the protocol latency from the minimum latency in the market can be presumed to yield a fair estimation of topological latency. As such, to estimate topological latency, core, access, and protocol latencies need to be considered. Accordingly, where RTT_p has previously been determined, e.g., at 610, topological latency for an i-th communication pathway (RTT_i_n) can be estimated by RTT_i_n=min(RTT_market)−RTT_p, where RTT_market can be the round-trip time from the performance data for a selected market. This can be expanded to RTT_i_n=min(RTT_market)−(min(RTT_all)).

At 640, method 600 can comprise enabling access to the network-induced latency information to facilitate a determined network response corresponding to the network-induced latency information. Method 600 can end at this point. In embodiments, topological latency can be used to determine a network response that can cause modification, alteration, update to, etc., a network, e.g., altering a topology of a network, steering traffic in the network, causing repair of a network, etc.

FIG. 7 illustrates example method 700 that facilitates estimating network topological latency based on third-party aggregated performance data and non-third-party performance data, in accordance with aspects of the subject disclosure. Method 700, at 715, can comprise receiving, from a UE, network performance information corresponding to a testing instance executing at the user equipment. Communication pathways between endpoints can be tested, e.g., via testing instances, which can result in end-to-end performance data. In some embodiments, such as at 610 of method 600, etc., performance data can be captured by a third-party entity, e.g., an entity other than a user of an endpoint, a network entity, etc., and can be shared, sold, etc., to a network entity. However, at 715 of method 700, embodiments are explicitly illustrated as receiving performance data outside of access via a third-party entity, e.g., performance data can be captured by testing instances that can be the same as, or similar to, testing instances employed by a third-party, but can, for example, communicate captured performance data directly to a network entity from a UE without traversing a third-party component. It is noted that method 700 can, in some embodiments further comprise an operation similar to 610 of method 600 such that both third-party and direct performance testing can be performed, as is disclosed elsewhere herein. Topological latency can be estimated based on analysis of crowdsourced end-to-end performance measurements.

At 720, method 700 can comprise, determining protocol-induced latency information based on aggregated performance information comprising the network performance information. Protocol latency can generally be regarded as a lowest possible latency and is present even in a perfect end-to-end communication pathway. It can be assumed that among the huge numbers of measurements, where millions of performance tests would not be unusual, some testing of a nearly perfect network condition can occur where access latency is nearly zero, core latency is nearly zero, and topological latency is nearly zero, such that the dominant effect on latency is a result of protocol latency. As such, protocol latency (RTT_p) can be estimated as RTT_p=min(RTT_all), where RTT_all can be the round-trip time from the performance data for all markets, e.g., the aggregated performance data.

Method 700, at 730, can comprise determining network-induced latency information for a selected market based on the protocol-induced latency information and a portion of the aggregated performance information corresponding to the selected market. Generally, crowdsourced UEs can execute test instances for corresponding communications pathways to many endpoints. As previously noted, increasing a count of measurements typically can be associated with increased accuracy of topological latency estimation. As such, where massive counts of end-to-end performance measurements are available, a minimum measurement across all markets can be treated as representative of protocol latency, and within a defined market of the markets a presumption can be made that access latency and/or core latency will be similar such that a market minimum can represent a near zero access and core latency, then within the defined market, subtracting the protocol latency from the minimum latency in the market can be presumed to yield a fair estimation of topological latency. As such, to estimate topological latency, core, access, and protocol latencies need to be considered. Accordingly, where RTT_p has previously been determined, e.g., at 710, topological latency for an i-th communication pathway (RTT_i_n) can be estimated by RTT_i_n=min(RTT_market)−RTT_p, where RTT_market can be the round-trip time from the performance data for a selected market. This can be expanded to RTT_i_n=min(RTT_market)−(min(RTT_all)).

At 735, method 700 can comprise determining a network distance information based on the network-induced latency information. Conversion between a time domain, e.g., topological latency, and a distance domain, e.g., network distance information, also referred to as topological distance, can be premised on the speed of signal propagation in a communication pathway medium. Signal propagation is typically at the speed of light in the communication pathway medium, for example a photon propagating through a fiber optical cable occurs at the speed of light in the fiber optical cable. Given that the network-induced latency information, e.g., topological latency, is generally measured for a round trip between the endpoints, the topological distance can be equal to RTT_i_n*S/2, where S is the speed of light in the commination path medium, e.g., the half of the total round-trip time corresponds to the distance between the tested endpoints.

At 740, method 700 can comprise enabling access to the network distance information to facilitate a determined network response corresponding to the network-induced latency information. Method 700 can end at this point. In some embodiments, topological latency can be used to determine a network response that can cause modification, alteration, update to, etc., a network, e.g., altering a topology of a network, steering traffic in the network, causing repair of a network, etc. Similarly, in some embodiments, network distance, e.g., topological distance, can be a metric used to determine a network response.

FIG. 8 illustrates example method 800 facilitating triggering a network topological response based on an estimation of network topological latency, in accordance with aspects of the subject disclosure. At 810, method 800 can comprise receiving, from a UE, first network performance information corresponding to a first testing instance executing at the user equipment. Communication pathways between endpoints can be tested, e.g., via testing instances, which can result in end-to-end performance data. In some embodiments, performance data can be captured by a third-party entity, e.g., an entity other than a user of an endpoint, a network entity, etc., and can be shared, sold, etc., to a network entity.

Additionally, at 815, method 800 can comprise receiving, from a second testing instance executing at a user equipment, second network performance information. This can be similar to 715 of method 700, where performance data can be received without reliance on a third-party entity, e.g., second performance data can be captured by second testing instances that can be the same as, or similar to, first testing instances employed by a third-party, but can, for example, communicate captured second performance data directly to a network entity from a UE without traversing a third-party component. As such, both third-party and direct performance testing can be performed, as is disclosed elsewhere herein. Topological latency can be estimated based on analysis of these crowdsourced end-to-end performance measurements.

At 820, method 800 can comprise, determining protocol-induced latency information based on aggregated performance information comprising the network performance information. Protocol latency can generally be regarded as a lowest possible latency and is present even in a perfect end-to-end communication pathway. It can be assumed that among the huge numbers of measurements, where millions of performance tests would not be unusual, some testing of a nearly perfect network condition can occur where access latency is nearly zero, core latency is nearly zero, and topological latency is nearly zero, such that the dominant effect on latency is a result of protocol latency. As such, protocol latency (RTT_p) can be estimated as RTT_p=min(RTT_all), where RTT_all can be the round-trip time from the performance data, e.g., first performance data and second performance data, for all markets, e.g., the aggregated performance data.

Method 800, at 830, can comprise determining network-induced latency information for a selected market based on the protocol-induced latency information and a portion of the aggregated performance information corresponding to the selected market. Generally, crowdsourced UEs can execute test instances for corresponding communications pathways to many endpoints. As previously noted, increasing a count of measurements typically can be associated with increased accuracy of topological latency estimation. As such, where massive counts of end-to-end performance measurements are available, a minimum measurement across all markets can be treated as representative of protocol latency, and within a defined market of the markets a presumption can be made that access latency and/or core latency will be similar such that a market minimum can represent a near zero access and core latency, then within the defined market, subtracting the protocol latency from the minimum latency in the market can be presumed to yield a fair estimation of topological latency. As such, to estimate topological latency, core, access, and protocol latencies need to be considered. Accordingly, where RTT_p has previously been determined, e.g., at 810, topological latency for an i-th communication pathway (RTT_i_n) can be estimated by RTT_i_n=min(RTT_market)−RTT_p, where RTT_market can be the round-trip time from the performance data for a selected market. This can be expanded to RTT_i_n=min(RTT_market)−(min(RTT_all)).

At 840, method 800 can comprise facilitating a network alteration operation based on the network-induced latency information, e.g., topological latency, wherein the network alteration operation is selected from a group of operations comprising a topology alteration operation, a repair initiation operation, and a traffic steering operation. Method 800 can end at this point. As previously disclosed, some embodiments of the disclosed subject matter can facilitate, enable, trigger, or otherwise cause a network response based on an estimated topological latency. At 840, a network response can be an operation that can cause modification, alteration, update to, etc., a network, e.g., a network alteration operation, which can be selected from a group of operations that can comprise a topology alteration operation, a repair initiation operation, a traffic steering operation, etc. As noted elsewhere herein, topological latency is one of the most widely used metrics in network design, implementation, operation, and adaptation. As such, topological latency, and derivatives thereof, such as topological distance, etc., can be widely used and the group of operations can comprise many more operations than are enumerated herein, although these other operations are not explicitly recited for the sake of clarity and brevity, they are to be considered within the scope of the instant disclosure.

Figure 9:
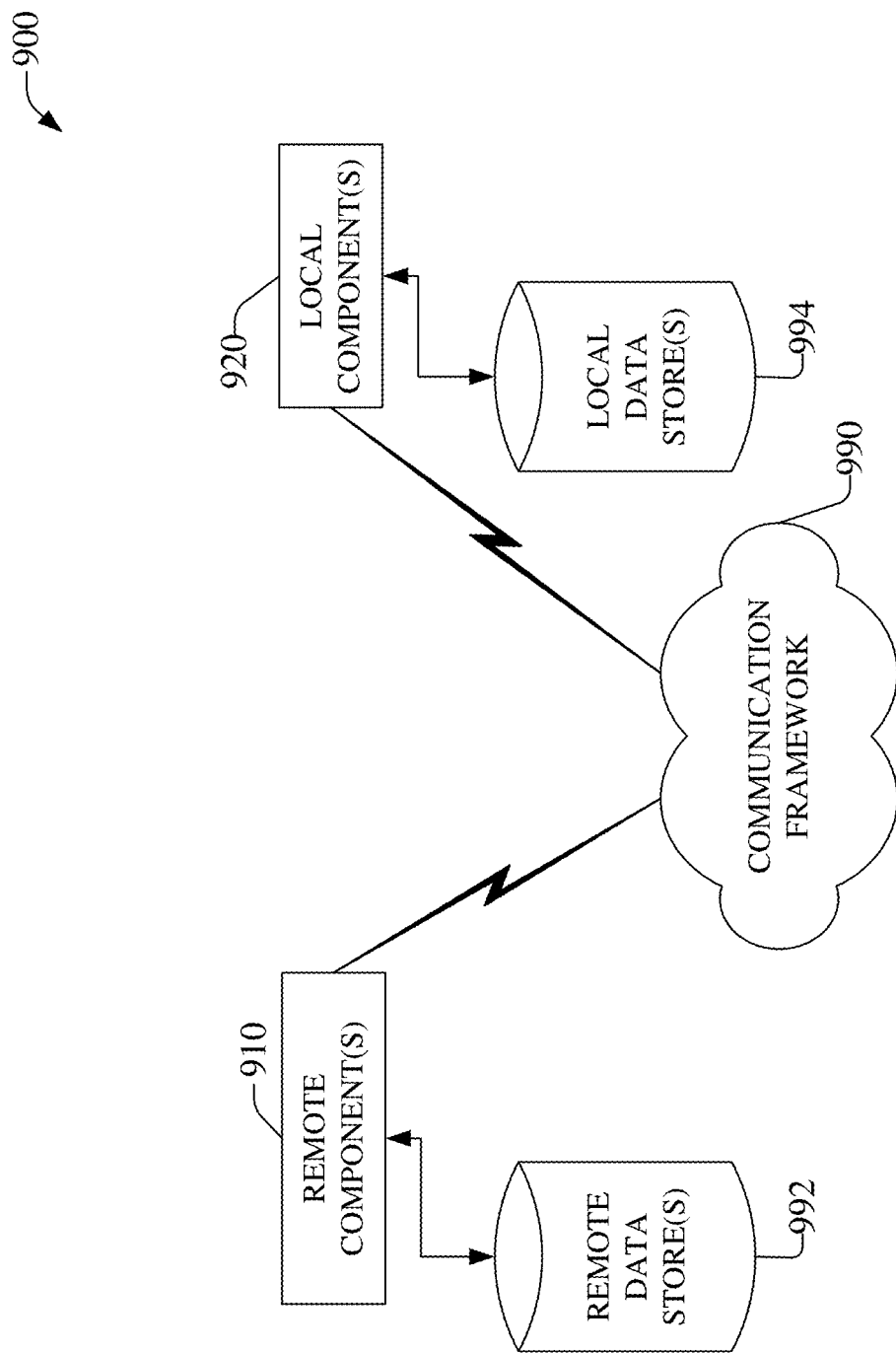
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise UE 102-202, etc., endpoint 106-206, etc., testing instance 104-205, etc., PTC 120-220, etc., NCC 108-208, etc., LDC 110-510, etc., PIAC 330-530, etc., PLDC 332-532, etc., grouping component 334-534, etc., NLDC 336-536, etc., NTRC 540, etc., or any other component that is located remotely from another component of systems 100-500, etc.

The system 900 also comprises one or more local component(s) 920. The local component(s) 920 can be hardware and/or software (e.g., threads, processes, computing devices). In some embodiments, local component(s) 920 can comprise UE 102-202, etc., endpoint 106-206, etc., testing instance 104-205, etc., PTC 120-220, etc., NCC 108-208, etc., LDC 110-510, etc., PIAC 330-530, etc., PLDC 332-532, etc., grouping component 334-534, etc., NLDC 336-536, etc., NTRC 540, etc., or any other component that is located local to another component of systems 100-500, etc. As one of many possible examples, PTC 120 can be a third-party test component that can be located remotely from NCC 108 and can communicate performance information 122, based on testing between UE 102 and endpoint 106, to NCC 108 such that LDC 110 can determine latency information 112, whereby latency information 112 can be employed to determine a network response.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 990 that can comprise path segments, path parts, etc., that can be employed to facilitate communications between the remote component(s) 910 and the local component(s) 920, and can comprise a fiber segment, metal segment, e.g., copper segment, etc., an air interface segment, e.g., Uu interface of a UMTS network, via a long-term evolution (LTE) network, 5G, 6G, and/or another path segment. Remote component(s) 910 can be operably connected to one or more remote data store(s) 992, such as a hard drive, solid state drive, SIM card, eSIM, device memory, etc., that can be employed to store information on the remote component(s) 910 side of communication framework 990. Similarly, local component(s) 920 can be operably connected to one or more local data store(s) 994, that can be employed to store information on the local component(s) 920 side of communication framework 990. As an example, PTC 120 can be a third-party test component that can be located remotely from NCC 108. PTC 120 can comprise a data store, e.g., remote data store 992 that can store testing data that can be communicated, as performance information 122, to NCC 108, etc. NCC 108 can comprise local data store 994 to store performance information 122. LDC 110 of NCC 108 can determine latency information 112 based on performance information 122 retrieved from local data store 994, whereby latency information 112 can be employed to determine a network response.

Figure 10:
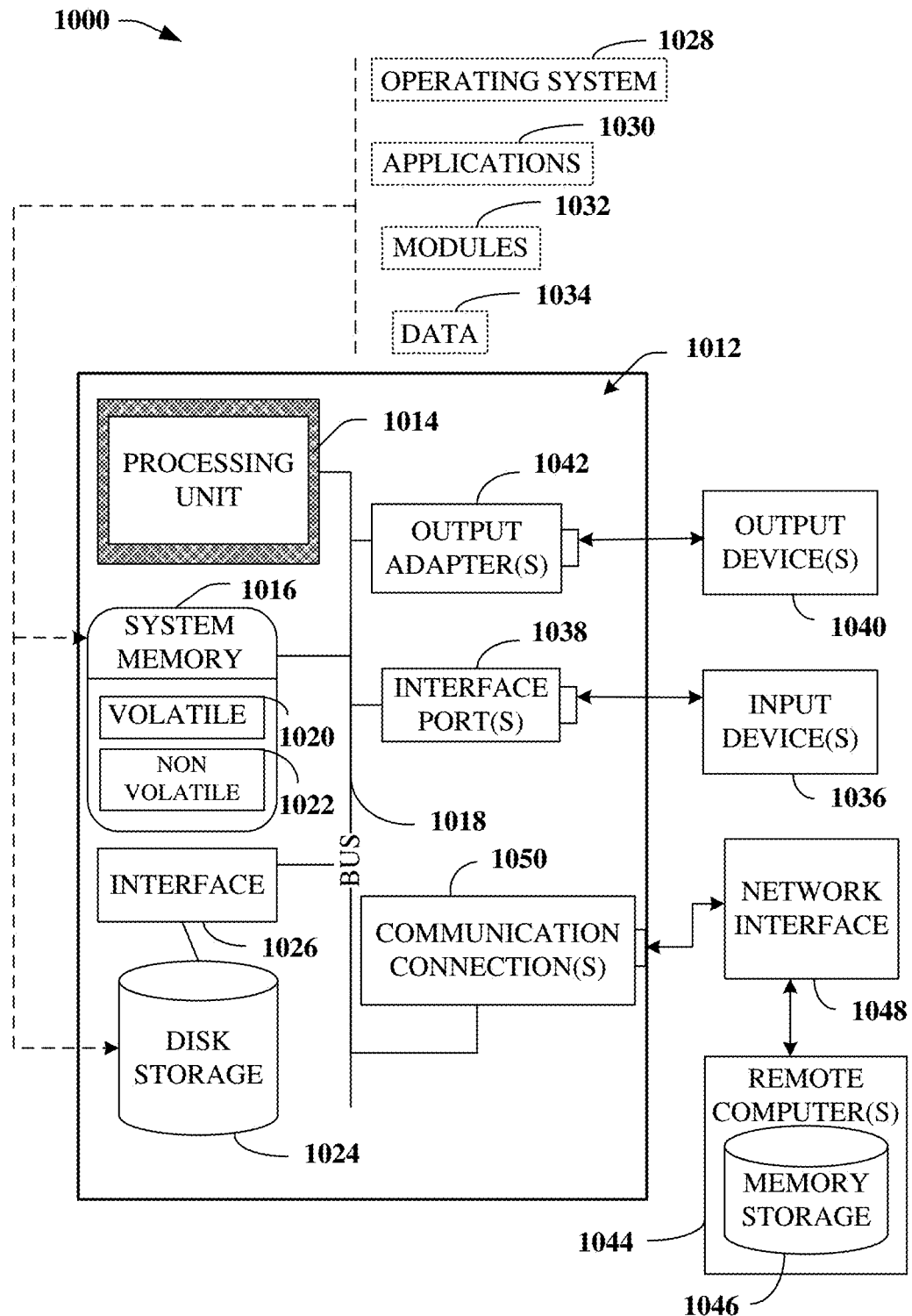
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random-access memory, synchronous dynamic random-access memory, double data rate synchronous dynamic random-access memory, enhanced synchronous dynamic random-access memory, SynchLink dynamic random-access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can, for example, be comprised in, or can comprise, UE 102-202, etc., endpoint 106-206, etc., testing instance 104-205, etc., PTC 120-220, etc., NCC 108-208, etc., LDC 110-510, etc., PIAC 330-530, etc., PLDC 332-532, etc., grouping component 334-534, etc., NLDC 336-536, etc., NTRC 540, etc., or any other component of systems 100-500, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random-access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory, or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory, or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries, or other data retrieval protocols, for a variety of operations with respect to the information stored by the medium. As such, for example, a computer-readable medium can comprise executable instructions stored thereon that, in response to execution, can cause a system comprising a processor to perform operations comprising receiving performance information and defining protocol-induced latency as a minimum communication path latency indicated in the performance information. A network-distance-based latency for a communication path can be defined as a minimum communication path latency, of a selected group of communication paths indicated in the performance information, minus the protocol-induced latency. Implementation of a network response operation can be facilitated based on the network-distance-based latency information.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line-controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring, and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), fifth generation partnership project (5G or 5GPP); sixth generation partnership project (6G or 6GPP), next generation (NG) radio, LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to authenticating a user-identity to a user-account. Authentication can, in some embodiments, refer to determining whether a user-identity requesting a service from a telecom network is authorized to do so within the network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); sixth generation partnership project (6G or 6GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength (X) for millimeter waves is typically in the 1-mm to 10-mm range.

The term "infer", or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices, and drawings such terms are intended to be inclusive in a manner similar to the term "comprising" as "comprising" is interpreted when employed as a transitional word in a claim.

What is claimed is:

1. A device, comprising:
a processor; and
a memory that stores executable instructions that, when executed by the processor, facilitate performance of operations, the operations comprising:
receiving end-to-end communication path performance information corresponding to testing of end-to-end communication paths between various pairs of user equipment and endpoints via a network, wherein each pair comprises a respective user equipment and a respective endpoint;
determining a protocol-induced latency based on the end-to-end communication path performance information, wherein the protocol-induced latency is determined to comprise a first minimum end-to-end communication path latency indicated in the end-to-end communication path performance information;
determining a network-distance-based latency, wherein the network-distance-based latency is determined to comprise a second minimum end-to-end communication path latency of a selected group of end-to-end communication paths indicated in a portion of the end-to-end communication path performance information minus the protocol-induced latency, wherein the end-to-end communication path performance information is associated with a plurality of markets of the network, and wherein the portion of the end-to-end communication path performance information is specific to a defined market of the plurality of markets of the network; and
enabling determining a network response operation based on the network-distance-based latency.

2. The device of claim 1, wherein the end-to-end communication path performance information is crowdsourced end-to-end communication path performance information.

3. The device of claim 1, wherein the end-to-end communication path performance information is received from third-party equipment corresponding to a third-party entity, wherein the third-party equipment does not correspond to a network operator entity, and wherein the third-party equipment is not a user equipment.

4. The device of claim 1, wherein the end-to-end communication path performance information comprises a first portion and a second portion, and wherein the first portion is received from third-party equipment corresponding to a third-party entity, and wherein the second portion is received from at least one user equipment.

5. The device of claim 1, wherein the end-to-end communication path performance information is received, directly from at least one user equipment, by network equipment corresponding to a network operator entity.

6. The device of claim 1, wherein the selected group of end-to-end communication paths are selected based on a level of similarity between end-to-end communication paths indicated in the end-to-end communication path performance information.

7. The device of claim 1, wherein an accuracy of the network-distance-based latency increases as a count of end-to-end communication path tests indicated in the end-to-end communication path performance information increases.

8. The device of claim 1, wherein, based on the network-distance-based latency, the network response operation comprises at least one of: a network topology adaptation operation, a traffic steering operation, or a repair operation.

9. The device of claim 1, wherein a network distance information is determined from the network-distance-based latency based on a speed of signal propagation in a corresponding communication path medium.

10. The device of claim 9, wherein, based on the network distance information determined from the network-distance-based latency, the network response operation comprises at least one of: a network topology adaptation operation, a traffic steering operation, or a repair operation.

11. A method, comprising:
accessing, by a system comprising a processor, crowdsourced end-to-end communication path performance information corresponding to testing of end-to-end communication paths between various pairs of user equipment and endpoints via a network, wherein each pair comprises a respective user equipment and a respective endpoint;
determining, by the system, a protocol-induced latency based on the crowdsourced end-to-end communication path performance information, wherein the protocol-induced latency is determined to comprise a first minimum end-to-end communication path latency indicated in the crowdsourced end-to-end communication path performance information;
determining, by the system, a network-distance-based latency, wherein the network-distance-based latency is determined to comprise a second minimum end-to-end communication path latency of a selected group of end-to-end communication paths indicated in a selectable portion of the crowdsourced end-to-end communication path performance information minus the protocol-induced latency, wherein the crowdsourced end-to-end communication path performance information is associated with a plurality of markets of the network, and wherein the selected group of end-to-end communication paths is selected based on a defined market of the plurality of markets; and
facilitating, by the system, implementing a network response operation based on the network-distance-based latency.

12. The method of claim 11, wherein a portion of the crowdsourced end-to-end communication path performance information is purchased from an entity other than a network entity corresponding to the network.

13. The method of claim 11, wherein a portion of the crowdsourced end-to-end communication path performance information is generated by an application operating on a first user equipment of the user equipment, and wherein the application was developed on behalf of a network entity corresponding to the network.

14. A non-transitory machine-readable medium, comprising executable instructions that, when executed by a processor, facilitate performance of operations, the operations comprising:
receiving crowdsourced end-to-end communication path performance information corresponding to testing of end-to-end communication paths between various pairs of user equipment and endpoints of a network, wherein each pair comprises a respective user equipment and a respective endpoint;

defining a protocol-induced latency as a first minimum end-to-end communication path latency indicated in the crowdsourced end-to-end communication path performance information;

defining a network-distance-based latency, for an end-to-end communication path of the end-to-end communication paths indicated in the crowdsourced end-to-end communication path performance information, as a second minimum end-to-end communication path latency of a selected group of end-to-end communication paths indicated in the crowdsourced end-to-end communication path performance information minus the protocol-induced latency, wherein the crowdsourced end-to-end communication path performance information is associated with a plurality of markets of the network, and wherein the selected group of end-to-end communication paths is specific to a defined market of the plurality of markets of the network; and enabling implementation of a network response operation based on the network-distance-based latency.

15. The non-transitory machine-readable medium of claim 14, wherein a portion of the crowdsourced end-to-end communication path performance information is purchased from a second entity other than a network entity corresponding to the network.

16. The non-transitory machine-readable medium of claim 14, wherein an accuracy of the network-distance-based latency increases as a count of end-to-end communication path tests indicated in the crowdsourced end-to-end communication path performance information increases.

17. The non-transitory machine-readable medium of claim 15, wherein the second entity is not a user equipment.

18. The non-transitory machine-readable medium of claim 14, wherein, based on the network-distance-based latency, the network response operation comprises at least one of: a network topology adaptation operation, a traffic steering operation, or a repair operation.

19. The non-transitory machine-readable medium of claim 14, wherein a portion of the crowdsourced end-to-end communication path performance information is generated by an application operating on a first user equipment of the user equipment, and wherein the application was developed on behalf of a network entity corresponding to the network.

20. The non-transitory machine-readable medium of claim 14, wherein the crowdsourced end-to-end communication path performance information is received, directly from at least one user equipment, by network equipment corresponding to a network operator entity.

* * * * *